(No Model.)  3 Sheets—Sheet 1.

J. M. DUNCAN.
VACUUM PAN.

No. 496,111.  Patented Apr. 25, 1893.

Witnesses:
Emil Neuhart
Fred. C. Geyer

J. M. Duncan, Inventor.
By Wilhelm Bonner,
Attorneys.

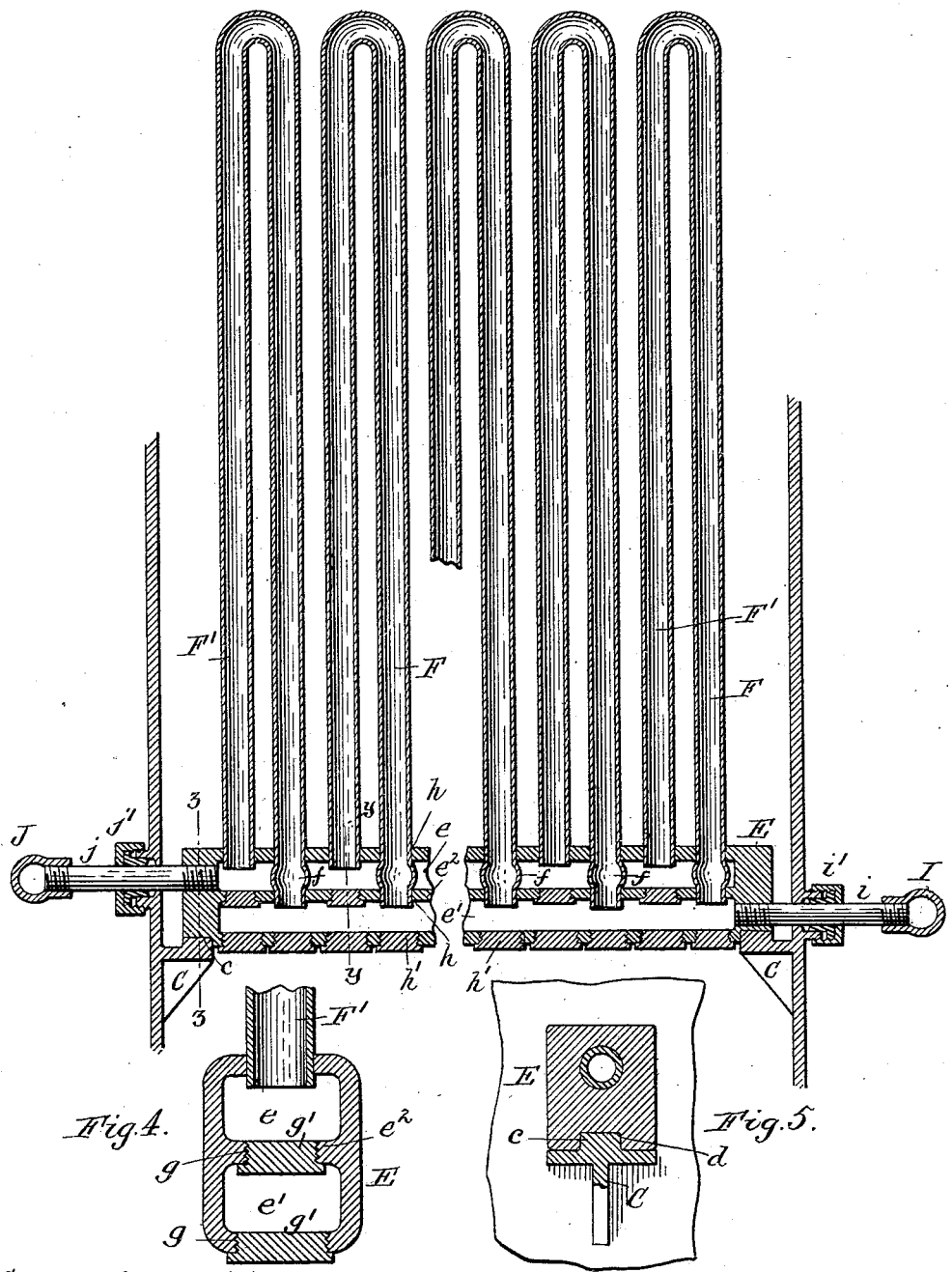

(No Model.)  3 Sheets—Sheet 3.

J. M. DUNCAN.
VACUUM PAN.

No. 496,111.  Patented Apr. 25, 1893.

Witnesses:
Emil Neuhart
Fred. C. Geyer

Joseph M. Duncan, Inventor.
By Wilhelm Bonner
Attorneys.

UNITED STATES PATENT OFFICE.

JOSEPH M. DUNCAN, OF SILVER SPRINGS, NEW YORK.

VACUUM-PAN.

SPECIFICATION forming part of Letters Patent No. 496,111, dated April 25, 1893.

Application filed October 19, 1891. Serial No. 409,188. (No model.)

*To all whom it may concern:*

Be it known that I, JOSEPH M. DUNCAN, a citizen of the United States, residing at Silver Springs, in the county of Wyoming and State of New York, have invented new and useful Improvements in Evaporating-Pans, of which the following is a specification.

This invention relates to evaporating or vacuum pans having internal heating sections which are removably supported in the pan, so that they can be conveniently cleaned, when necessary, and which are arranged vertically in the pan, so as to prevent the salt or other solid substance in the boiling liquid from lodging on the heating pipes and incrusting the same. An evaporating pan of this general construction is described and shown in Letters Patent of the United States, No. 11,061, reissued to me February 18, 1890.

The object of my present invention is to simplify the construction of the heating sections and the pan and reduce the cost thereof.

Figure 1:
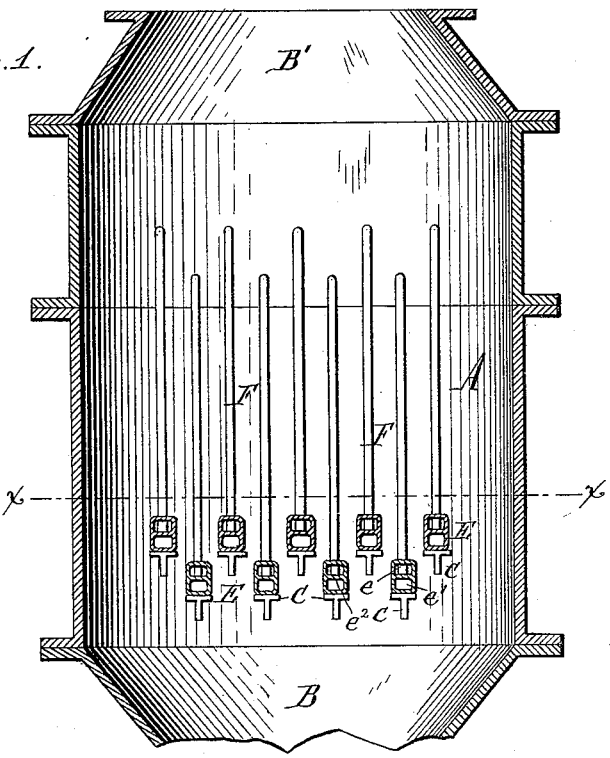
Figure 2:
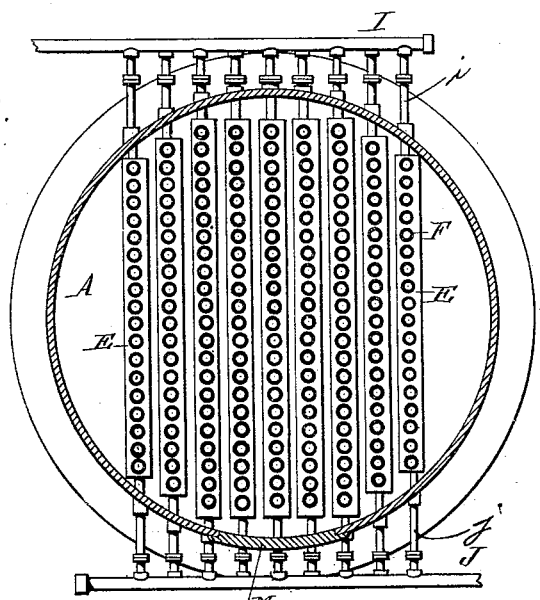
Figure 6:
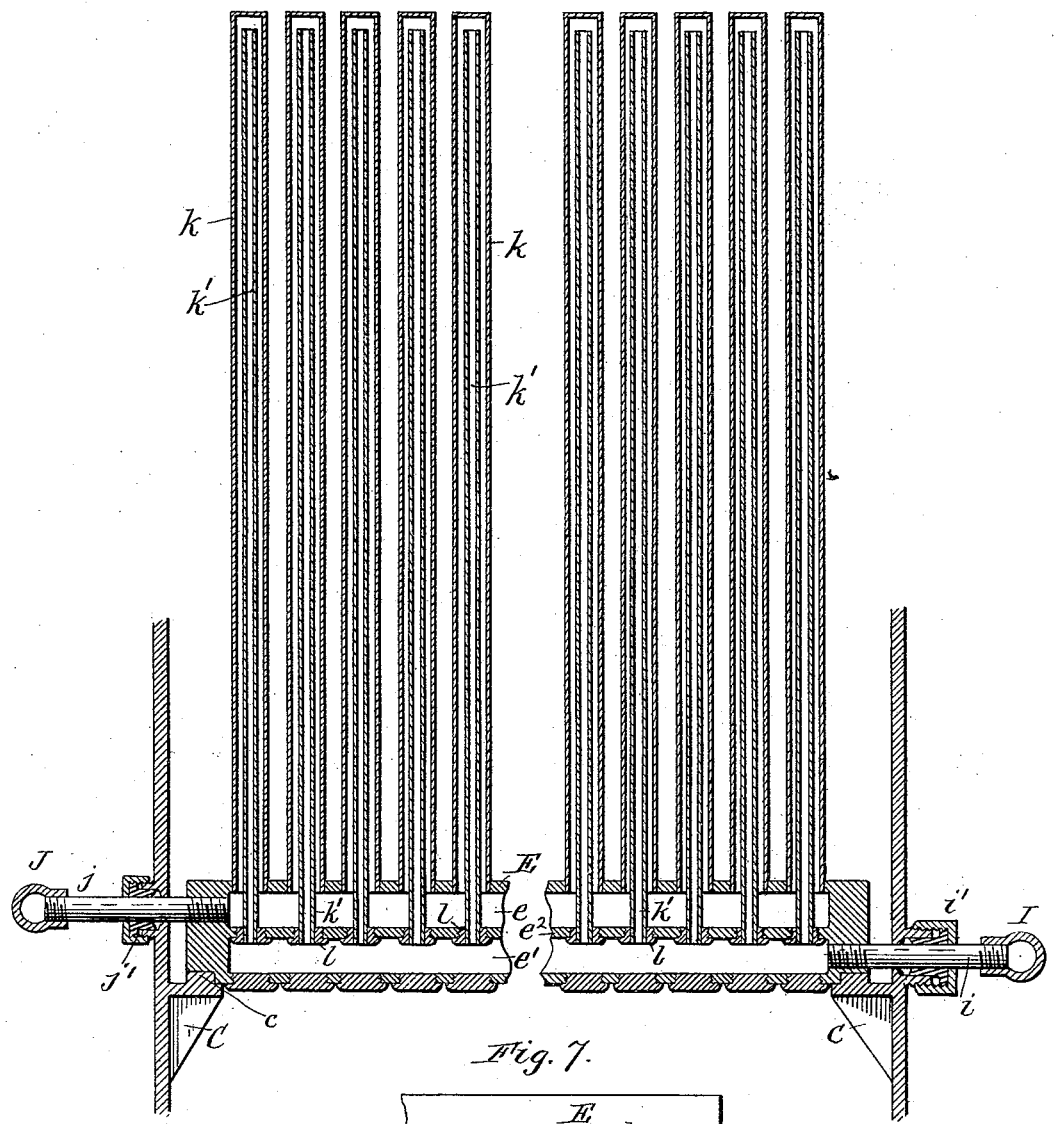
Figure 7:
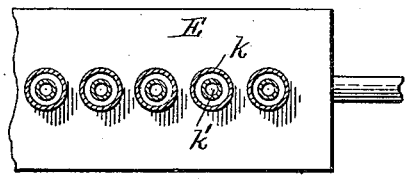

In the accompanying drawings consisting of three sheets:—Figure 1 is a fragmentary vertical section of an evaporating pan containing my improvement. Fig. 2 is a horizontal section thereof, in line $x$—$x$, Fig. 1. Fig. 3 is a fragmentary vertical section of the evaporating pan, at right angles to Fig. 1, and on an enlarged scale, the plane of the section being through one of the heating sections. Figs. 4 and 5 are cross sections in lines $y$—$y$ and $z$—$z$, Fig. 3, respectively. Fig. 6 is a view similar to Fig. 3, showing a modified construction of the heating sections. Fig. 7 is a fragmentary horizontal section of one of the heating sections embodying such modification.

Like letters of reference refer to like parts in the several figures.

A represents the central portion of the evaporating pan forming the heating chamber. This chamber may be of any desired form, but is preferably cylindrical, as shown in the drawings.

B is the funnel-shaped bottom of the pan in which the salt crystals settle and B' is the tapering top with which is connected the pipe whereby the vapors rising from the boiling brine are conducted to a suitable condenser.

The upright heating sections are arranged side by side in the heating chamber and are supported at opposite ends upon brackets or ledges C formed on the inner sides of the chamber, the brackets being provided with raised lugs $c$ which enter corresponding grooves or recesses $d$ in the under side of the heating sections, as shown in Figs. 3 and 5, whereby the sections are held against lateral displacement.

Each heating section is composed of upright heating pipes or tubes and a horizontal manifold E which is divided into independent upper and lower chambers $e$ $e'$ by a diaphragm or partition $e^2$. One of the chambers of each manifold, preferably the lower chamber, forms a supply chamber for the heating pipes, while the other forms a discharge chamber which receives the water of condensation from the pipes.

Each heating pipe consists of two communicating members or branches, viz: an ascending member F, which is connected at its lower end with the lower supply chamber of the manifold, and a descending member F', connected at its lower end with the upper discharge chamber of the manifold, so that the steam entering the supply chamber of the manifold rises in one branch of each heating pipe, while the water of condensation and steam descend in the other branch and pass into the discharge chamber of the manifold.

Each heating pipe preferably consists of a single length of tubing bent into the shape of an inverted U, to form two members or branches, as shown in Fig. 3. The ends of the short descending members of each heating pipe are secured in openings in the top plate of the manifold, preferably by expanding the same by means of expanding tool inserted through openings $g$, formed in the diaphragm $e^2$, and the bottom plate of the manifold, in line with the adjacent ends of such members, as represented in Figs. 3 and 4. After expanding the ends of the pipes, the holes $g$ are closed by screw plugs $g'$. The plugged openings in the bottom plate of the manifold are made large enough to admit the plugs of the apertures formed in the diaphragm. The lower ends of the long ascending members of the heating pipes pass through openings $h$ formed in the top plate and the diaphragm of the manifold and are also secured therein by expansion, the bottom plate of the manifold being formed with plugged apertures $h'$ for the introduction of the expanding tool. The portions of the pipe members F located between the top plate and the diaphragm of each manifold are preferably formed with a bulge or corrugation $f$, as shown in Fig. 3 to allow for the expansion of the pipes between the points at which it is expanded.

The supply chamber of each manifold is furnished with steam by a pipe $i$ which passes through a stuffing box $i'$ in the wall of the heating chamber and is connected with a main supply pipe I. The water of condensation accumulating in the discharge chamber of the manifold flows into a common discharge pipe J, through pipes $j$ passing through the wall of the pan and provided with stuffing boxes $j'$.

The upright heating sections are preferably arranged in rows, one above the other, with the manifolds of one row standing opposite the spaces between the manifolds of the other row, as shown in Fig. 1. By this arrangement, spaces or passages of sufficient width are left between the heating sections to permit of a free circulation of the boiling brine in the heating chamber.

Instead of forming the two members of each pipe of a single bent tube, they may be constructed of two separate pipes or tubes $k$ $k'$ arranged one within the other, as shown in Figs. 6 and 7 the inner pipe being sufficiently smaller than the outer pipe to leave an intervening annular space for the passage of the steam. In this modification, the small pipe opens at its upper end into the upper portion of the large pipe and at its lower end into the supply chamber of the manifold, while the large pipe is closed at its upper end and communicates at its lower end with the discharge chamber of the manifold, so that the steam ascends through the small pipe and descends in the space between the two pipes. The lower ends of the large pipes $k$ are expanded directly into openings in the top plate of the manifold, while the lower ends of the small pipes are preferably expanded into hollow screw nuts $l$ secured in threaded openings in the diaphragm.

The heating chamber is provided in its front side with a door M through which the heating sections can be independently removed for cleaning or repairing the same, upon disconnecting them from their inlet and outlet connections.

The construction of the heating sections hereinbefore described is very simple and comparatively inexpensive. It dispenses with the separate supply and discharge manifolds heretofore arranged on the interior of the evaporating pan and thus simplifies and cheapens the construction of the evaporating pan.

As the heating pipes are arranged vertically in the heating chamber of the pan, they form no supports or ledges upon which the salt crystals can lodge, but present smooth, upright surfaces to which the gravitating crystals are not liable to adhere.

I claim as my invention—

1. The combination with an evaporating pan having an opening in one of its walls for the insertion and removal of heating sections, of individually removable heating sections arranged side by side in the pan, separated by intervening circulating passages and each composed of a narrow oblong manifold having horizontal supply and discharge chambers arranged one above the other, and a single row of vertical heating pipes each consisting of two communicating members connected respectively with said chambers, substantially as set forth.

2. The combination with an evaporating pan having an opening in one of its walls for the insertion and removal of heating sections, of two tiers of individually removable heating sections arranged in the pan with the sections of one tier arranged opposite the spaces between the sections of the other tier, each heating section being composed of a narrow oblong manifold having horizontal supply and discharge chambers arranged one above the other and a single row of vertical heating pipes, each consisting of two communicating members connected respectively with said chambers, substantially as set forth.

3. The combination with an evaporating pan having an opening in one of its walls for the insertion and removal of heating sections of removable heating sections arranged in the pan, each composed of a manifold having a diaphragm dividing the same into independent supply and discharge chambers, and heating pipes, each consisting of two communicating chambers, one of which is connected with the supply chamber of the manifold and the other with the discharge chamber thereof, each long member of the pipes being provided with a bulge or corrugation between its points of attachment to the manifold, substantially as set forth.

Witness my hand this 1st day of September, 1891.

JOSEPH M. DUNCAN.

Witnesses:
EDWARD A. WASHBURN,
GEORGE BOWEN.